(12) United States Patent
Gaur et al.

(10) Patent No.: US 12,524,599 B2
(45) Date of Patent: Jan. 13, 2026

(54) SMART SCROLLING FOR DATA EXPLORATION OF TABLES

(71) Applicant: SAP SE, Walldorf (DE)

(72) Inventors: Richa Gaur, Bangalore (IN); Selvakumar Palanisamy, Bangalore (IN); Harsha Vardhana Kurru, Vlsakha Patnam (IN)

(73) Assignee: SAP SE, Walldorf (DE)

( * ) Notice: Subject to any disclaimer, the term of this patent is extended or adjusted under 35 U.S.C. 154(b) by 78 days.

(21) Appl. No.: 18/522,586

(22) Filed: Nov. 29, 2023

(65) Prior Publication Data
US 2025/0173497 A1    May 29, 2025

(51) Int. Cl.
G06F 40/106    (2020.01)
G06F 3/0485    (2022.01)

(52) U.S. Cl.
CPC .......... G06F 40/106 (2020.01); G06F 3/0485 (2013.01)

(58) Field of Classification Search
CPC .............................. G06F 40/106; G06F 3/0485
See application file for complete search history.

(56) References Cited

U.S. PATENT DOCUMENTS 7,676,759 B2 *  3/2010  Carter .................. G06F 3/0485
                                                      715/830
8,204,880 B2    6/2012  Vignet
9,766,795 B2    9/2017  Sauermann
9,996,520 B2    6/2018  Steele
11,392,761 B2   7/2022  Wan et al.
2008/0082938 A1* 4/2008 Buczek .................. G06F 40/18
                                                      715/227
2010/0169823 A1* 7/2010 Audet .................... G06Q 10/10
                                                      715/810
2011/0289398 A1* 11/2011 Chin ...................... G06F 40/18
                                                      715/227
2013/0080888 A1* 3/2013 Audet .................. G06F 40/106
                                                      715/277
2023/0289518 A1* 9/2023 D ........................ G06F 3/04815

FOREIGN PATENT DOCUMENTS

CN    113778306    12/2021
KR    102036726    10/2019

* cited by examiner

Primary Examiner — Hope C Sheffield
(74) Attorney, Agent, or Firm — SCHWEGMAN LUNDBERG & WOESSNER, P.A.

(57) ABSTRACT

A computer-implemented method may comprise accessing data records comprising fields and identifying subsets of the data records based on the data records in each subset having an attribute in common with each other, with the subsets comprising a first subset and a second subset. The data records may be arranged in a page layout based on the identified subsets, with the data records being arranged into their subsets across a first dimension, and the fields being arranged across a second dimension. The page layout may be displayed, and a user interface element identifying the second subset may be displayed over the page layout. In response to receiving a user selection of the user interface element, the second subset may be moved from a first position to a second position, where the second position is within the viewport on the computing device.

14 Claims, 12 Drawing Sheets

SALES ORDERS

GROUP BY: CUSTOMER NAME

| ORDER # | TRANSPORT | CUSTOMER | SUPPLIER | VALUE | STATUS |
|---|---|---|---|---|---|
| ∨ CUST-A | | | | | |
| 50009071 | ROAD | CUSTOMER-A | SUPPLIER-P | 450 USD | IN EXECUTION |
| 50009072 | SHIP | CUSTOMER-A | SUPPLIER-X | 400 USD | COMPLETED |
| ∨ CUST-B | | | | | |
| 50008927 | ROAD | CUSTOMER-B | SUPPLIER-K | 500 USD | COMPLETED |
| 50008928 | AIR | CUSTOMER-B | SUPPLIER-Z | 550 USD | IN EXECUTION |
| 50008929 | ROAD | CUSTOMER-B | SUPPLIER-K | 250 USD | NOT STARTED |
| ∨ CUST-C | | | | | |
| 50009114 | SHIP | CUSTOMER-C | SUPPLIER-X | 400 USD | IN EXECUTION |
| > CUST-D | | | | | |
| > CUST-E | | | | | |
| > CUST-F | | | | | |

*FIG. 2*

| SALES ORDERS | | GROUP BY: CUSTOMER NAME | | | | |
|---|---|---|---|---|---|---|
| ORDER # | TRANSPORT | CUSTOMER | SUPPLIER | VALUE | STATUS | |
| ∨ CUST-E | | | | | | CUST-A |
| 50006948 | SHIP | CUSTOMER-E | SUPPLIER-W | 550 USD | IN EXECUTION | CUST-B |
| 50006949 | AIR | CUSTOMER-E | SUPPLIER-R | 500 USD | COMPLETED | |
| 50007131 | AIR | CUSTOMER-E | SUPPLIER-R | 600 USD | COM CUST-C | |
| ∨ CUST-F | | | | | | |
| 50006933 | ROAD | CUSTOMER-F | SUPPLIER-V | 450 USD | IN EXECUTION | CUST-D |
| ∨ CUST-G | | | | | | |
| 50007148 | SHIP | CUSTOMER-G | SUPPLIER-Z | 300 USD | IN EX CUST-E | |
| ∧ CUST-H | | | | | | CUST-F |
| 50007088 | ROAD | CUSTOMER-H | SUPPLIER-Q | 650 USD | COM CUST-G | |
| 50007090 | AIR | CUSTOMER-H | SUPPLIER-P | 500 USD | COM CUST-H | |
| ∨ CUST-I | | | | | | CUST-I |

FIG. 3

| SALES ORDERS | | | | | | | |
|---|---|---|---|---|---|---|---|
| ORDER # | TRANSPORT | CUSTOMER | SUPPLIER | VALUE | STATUS | WEIGHT | |
| 50009071 | ROAD | CUSTOMER-A | SUPPLIER-P | 450 USD | IN EXECUTION | 900 KG | |
| 50009072 | SHIP | CUSTOMER-A | SUPPLIER-X | 400 USD | COMPLETED | 750 KG | |
| 50008927 | ROAD | CUSTOMER-B | SUPPLIER-K | 500 USD | COMPLETED | 800 KG | |
| 50008928 | AIR | CUSTOMER-B | SUPPLIER-Z | 550 USD | IN EXECUTION | 800 KG | |
| 50008929 | ROAD | CUSTOMER-B | SUPPLIER-K | 250 USD | NOT STARTED | 950 KG | |
| 50009114 | SHIP | CUSTOMER-C | SUPPLIER-X | 400 USD | IN EXECUTION | 700 KG | |
| 50009355 | ROAD | CUSTOMER-D | SUPPLIER-K | 500 USD | COMPLETED | 800 KG | |
| 50009356 | AIR | CUSTOMER-D | SUPPLIER-Z | 550 USD | IN EXECUTION | 800 KG | |
| 50009357 | ROAD | CUSTOMER-D | SUPPLIER-K | 250 USD | NOT STARTED | 950 KG | |
| 50009816 | SHIP | CUSTOMER-E | SUPPLIER-X | 400 USD | IN EXECUTION | 700 KG | |

FIG. 4

SALES ORDERS

| ORDER # | TRANSPORT | VALUE | STATUS | WEIGHT | VOLUME | DESTINATION |
|---|---|---|---|---|---|---|
| 50009071 | ROAD | 450 USD | IN EXECUTION | 900 KG | 2.00 MTQ | PORT OF NEW YORK |
| 50009072 | SHIP | 400 USD | COMPLETED | 750 KG | 2.00 MTQ | PORT OF NEW YORK |
| 50008927 | ROAD | 500 USD | COMPLETED | 800 KG | 1.00 MTQ | PORT OF SINES |
| 50008928 | AIR | 550 USD | IN EXECUTION | 800 KG | 1.00 MTQ | PORT OF GOLANSK |
| 50008929 | ROAD | 250 USD | NOT STARTED | 950 KG | 2.00 MTQ | PORT OF GOLANSK |
| 50009114 | SHIP | 400 USD | IN EXECUTION | 700 KG | 3.00 MTQ | PORT OF NEW YORK |
| 50009355 | ROAD | 500 USD | COMPLETED | 800 KG | 1.00 MTQ | PORT OF COLOMBO |
| 50009356 | AIR | 550 USD | IN EXECUTION | 800 KG | 4.00 MTQ | PORT OF SINES |
| 50009357 | ROAD | 250 USD | NOT STARTED | 950 KG | 2.00 MTQ | PORT OF MANILA |
| 50009816 | SHIP | 400 USD | IN EXECUTION | 700 KG | 1.00 MTQ | PORT OF NEW YORK |

( ORDER # )( TRANSPORT )( CUSTOMER )( SUPPLIER )( VALUE )( STATUS )( WEIGHT )( VOLUME )( MORE >> )

FIG. 5

SALES ORDERS

| ORDER # | TRANSPORT | SUPPLIER | VALUE | STATUS | WEIGHT | VOLUME |
|---|---|---|---|---|---|---|
| 50009071 | ROAD | SUPPLIER-P | 450 USD | IN EXECUTION | 900 KG | 2.00 MTQ |
| 50009072 | SHIP | SUPPLIER-X | 400 USD | COMPLETED | 750 KG | 2.00 MTQ |
| 50008927 | ROAD | SUPPLIER-K | 500 USD | COMPLETED | 800 KG | 1.00 MTQ |
| 50008928 | AIR | SUPPLIER-Z | 550 USD | IN EXECUTION | 800 KG | 1.00 MTQ |
| 50008929 | ROAD | SUPPLIER-K | 250 USD | NOT STARTED | 950 KG | 2.00 MTQ |
| 50009114 | SHIP | SUPPLIER-X | 400 USD | IN EXECUTION | 700 KG | 3.00 MTQ |
| 50009355 | ROAD | SUPPLIER-K | 500 USD | COMPLETED | 800 KG | 1.00 MTQ |
| 50009356 | AIR | SUPPLIER-Z | 550 USD | IN EXECUTION | 800 KG | 4.00 MTQ |
| 50009357 | ROAD | SUPPLIER-K | 250 USD | NOT STARTED | 950 KG | 2.00 MTQ |
| 50009816 | SHIP | SUPPLIER-X | 400 USD | IN EXECUTION | 700 KG | 1.00 MTQ |

( ORDER # ) ( TRANSPORT ) ( CUSTOMER ) ( SUPPLIER ) ( VALUE ) ( STATUS ) ( WEIGHT ) ( VOLUME ) ( MORE >> )

FIG. 6

| SALES ORDERS | | | | | | | |
|---|---|---|---|---|---|---|---|
| ORDER # | TRANSPORT | SUPPLIER | VALUE | STATUS | WEIGHT | VOLUME | |
| 50009071 | ROAD | SUPPLIER-P | 450 USD | IN EXECUTION | 900 KG | 2.00 MTQ | |
| 50009072 | SHIP | SUPPLIER-X | 400 USD | COMPLETED | 750 KG | 2.00 MTQ | |
| 50008927 | ROAD | SUPPLIER-K | 500 USD | COMPLETED | 800 KG | 1.00 MTQ | |
| 50008928 | AIR | SUPPLIER-Z | 550 USD | IN EXECUTION | 800 KG | 1.00 MTQ | |
| 50008929 | ROAD | SUPPLIER-K | 250 USD | NOT STARTED | 950 KG | 2.00 MTQ | |
| 50009114 | SHIP | SUPPLIER-K | 400 USD | IN EXECUTION | 700 KG | 3.00 MTQ | |
| 50009355 | ROAD | SUPPLIER-Z | 500 USD | COMPLETED | 800 KG | 1.00 MTQ | |
| 50009356 | AIR | SUPPLIER-K | 550 USD | IN EXECUTION | 800 KG | 4.00 MTQ | |
| 50009357 | ROAD | SUPPLIER-K | 250 USD | NOT STARTED | 950 KG | 2.00 MTQ | |
| 50009816 | SHIP | SUPPLIER-X | 400 USD | IN EXECUTION | 700 KG | 1.00 MTQ | |

( ORDER # ) ( TRANSPORT ) ( SUPPLIER ) ( CUSTOMER ) ( VALUE ) ( STATUS ) ( WEIGHT ) ( VOLUME ) ( MORE >> )

FIG. 7

SALES ORDERS — 210

| ORDER # | TRANSPORT | SUPPLIER | STATUS | WEIGHT | VOLUME | DESTINATION |
|---|---|---|---|---|---|---|
| 50009071 | ROAD | SUPPLIER-P | IN EXECUTION | 900 KG | 2.00 MTQ | PORT OF NEW YORK |
| 50009072 | SHIP | SUPPLIER-X | COMPLETED | 750 KG | 2.00 MTQ | PORT OF NEW YORK |
| 50008927 | ROAD | SUPPLIER-K | COMPLETED | 800 KG | 1.00 MTQ | PORT OF SINES |
| 50008928 | AIR | SUPPLIER-Z | IN EXECUTION | 800 KG | 1.00 MTQ | PORT OF GOLANSK |
| 50008929 | ROAD | SUPPLIER-K | NOT STARTED | 950 KG | 2.00 MTQ | PORT OF GOLANSK |
| 50009114 | SHIP | SUPPLIER-X | IN EXECUTION | 700 KG | 3.00 MTQ | PORT OF NEW YORK |
| 50009355 | ROAD | SUPPLIER-K | COMPLETED | 800 KG | 1.00 MTQ | PORT OF COLOMBO |
| 50009356 | AIR | SUPPLIER-Z | IN EXECUTION | 800 KG | 4.00 MTQ | PORT OF SINES |
| 50009357 | ROAD | SUPPLIER-K | NOT STARTED | 950 KG | 2.00 MTQ | PORT OF MANILA |
| 50009816 | SHIP | SUPPLIER-X | IN EXECUTION | 700 KG | 1.00 MTQ | PORT OF NEW YORK |

(ORDER #) (TRANSPORT) (SUPPLIER) (CUSTOMER) (VALUE) (STATUS) (WEIGHT) (VOLUME) (MORE »)

FIG. 8

SMART SCROLLING FOR DATA EXPLORATION OF TABLES

BACKGROUND

When using current software tools to explore data in a table that has a large amount of data, users may start by applying filters to the table. However, even after applying filters and arranging the data into specific groups or sorting them, it is still difficult for users to maneuver through the table. Limited screen size becomes a significant obstacle when navigating through lengthy tables that have a lot of columns and thousands of rows. Users struggle to efficiently maneuver within such a table, as it is arduous to navigate between different datasets and columns seamlessly. Attempting to navigate through data using a software tool on a computing device having a small screen size is difficult and inefficient. Other technical challenges may arise as well.

BRIEF DESCRIPTION OF THE DRAWINGS

Some example embodiments of the present disclosure are illustrated by way of example and not limitation in the figures of the accompanying drawings, in which like reference numbers indicate similar elements.

FIGS. 2-8 illustrate different stages of an example graphical user interfaces (GUI) in which smart scrolling features of the data exploration system are used on a page layout being displayed on a computing device.

DETAILED DESCRIPTION

Figure 1:
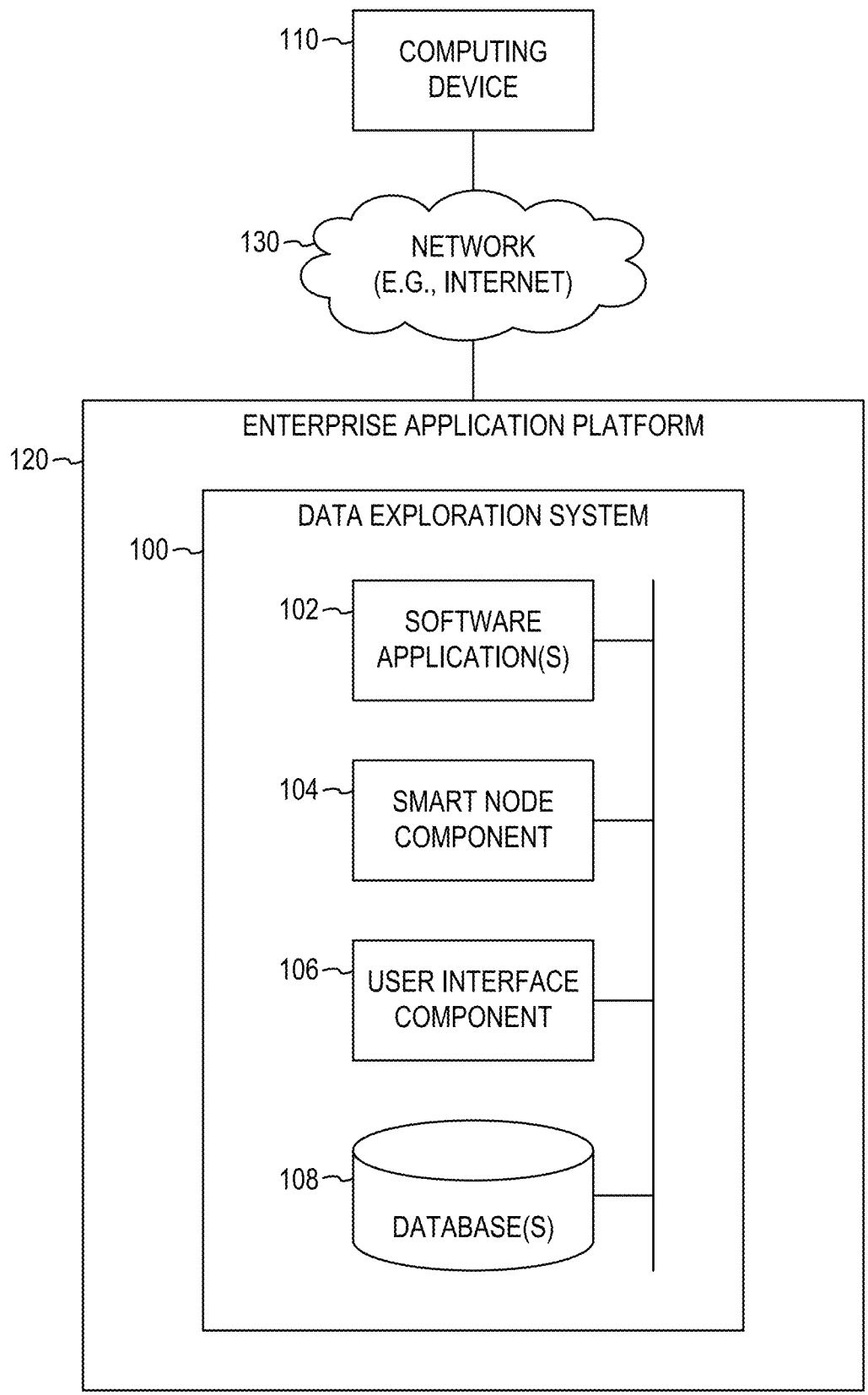
FIG. 1 is a block diagram illustrating an example data exploration system.

Example methods and systems of implementing smart scrolling for data exploration of tables are disclosed. In the following description, for purposes of explanation, numerous specific details are set forth in order to provide a thorough understanding of example embodiments. It will be evident, however, to one skilled in the art that the present embodiments can be practiced without these specific details.

The implementation of the features disclosed herein involves a non-generic, unconventional, and non-routine operation or combination of operations. By applying one or more of the solutions disclosed herein, some technical effects of the system and method of the present disclosure are to implement smart scrolling for data exploration of tables. The system and method disclosed herein may provide an improved user interface that helps users more efficiently scroll through data by providing user interface elements that trigger quick jumps to relevant data when selected by a user. These user interface elements may be implemented to enable quick jumps between data records or subsets of data records. For example, if the data records displayed in a table are grouped based on customer names, the improved user interface may provide selectable user interface elements that enable a user to jump between the different customer names included in the table. These user interface elements may additionally or alternatively be implemented to enable quick jumps between fields of data records. For example, the user interface may display all columns as selectable user interface elements and enable users to swiftly jump between relevant columns by selecting the corresponding user interface element, thereby enabling a seamless and efficient data exploration experience.

In some example embodiments, a computer-implemented method may comprise obtaining a plurality of data records, where each data record in the plurality of data records comprises a plurality of fields, and each field in the plurality of fields comprises data of a type corresponding to the field. A plurality of subsets of the plurality of data records may be identified based on the data records in each subset of the plurality of subsets having an attribute in common with each other data record in the subset, where the plurality of subsets comprises at least a first subset of the plurality of data records and a second subset of the plurality of data records. The computer-implemented method may further comprise arranging the plurality of data records in a page layout based on the identified plurality of subsets, where the plurality of data records are arranged into their corresponding subsets across a first dimension, and the plurality of fields are arranged across a second dimension, and then causing the page layout to be displayed on a computing device, where the causing of the page layout to be displayed comprises causing a user interface element identifying the second subset to be displayed over the page layout. A user selection of the user interface element may be received from the computing device, and, in response to the receiving of the user selection, the second subset may be caused to be moved from a first position in the page layout to a second position in the page layout, where the second position is within a viewport on the computing device.

The system and method disclosed herein may additionally or alternatively provide an improved user interface that enables users to move columns back and forth between a non-scrollable section of a viewport and a scrollable section of the viewport. In some example embodiments, a first portion of the fields of the plurality of fields may be displayed in a non-scrollable section of the viewport on the computing device, where the first portion of the fields in the non-scrollable section is unable to be scrolled across the second dimension, and a second portion of the fields of the plurality of fields may be displayed in a scrollable section of the viewport on the computing device, where the second portion of the fields in the scrollable section are able to be scrolled across the second dimension. A corresponding user interface element for each field that is displayed within the viewport may be caused to be displayed in alignment with the field, with the user interface element identifying the corresponding field. A user input indicating a movement of the user interface element of one of the fields in the scrollable section of the viewport into alignment with the non-scrollable section of the viewport may be received, and, in response to the receiving of the user input, the one of the fields may be moved from the scrollable section of the viewport into the non-scrollable section of the viewport, where the moved one of the fields is unable to be scrolled across the second dimension based on its movement into the non-scrollable section of the viewport. Additionally, a user input indicating a movement of the user interface element of one of the fields in the non-scrollable section of the viewport into alignment with the scrollable section of the viewport may be received, and, in response to the receiving of the user input, the one of the fields may be moved from the non-scrollable section of the viewport into the scrollable section of the viewport, where the moved one of the fields is able to be scrolled across the second dimension based on its movement into the scrollable section of the viewport.

By moving a column to the non-scrollable section of the viewport, the user may ensure that the column remains visible and stationary while scrolling through the columns in the non-scrollable section. This feature enables users to prioritize and focus on key data elements, enhancing the ease of use when working with data in table format. Other technical effects will be apparent from this disclosure as well.

The methods or embodiments disclosed herein may be implemented as a computer system having one or more modules (e.g., hardware modules or software modules). Such modules may be executed by one or more hardware processors of the computer system. In some example embodiments, a non-transitory machine-readable storage device can store a set of instructions that, when executed by at least one processor, causes the at least one processor to perform the operations and method steps discussed within the present disclosure.

The details of one or more variations of the subject matter described herein are set forth in the accompanying drawings and the description below. Other features and benefits of the subject matter described herein will be apparent from the description and drawings, and from the claims.

FIG. 1 is a block diagram illustrating an example data exploration system 100. In some example embodiments, the data exploration system 100 may comprise any combination of one or more of a software application 102, a smart node component 104, a user interface component 106, and one or more databases 108. The components shown in FIG. 1 may be configured to communicate with each other via interprocess communication or via one or more network connections, such as via the network 130 (e.g., the Internet).

One or more of the components of the data exploration system 100 may be implemented as part of a cloud-based system. For example, one or more of the components of the data exploration system 100 may be incorporated into an enterprise application platform 120, providing server-side functionality via the network 130 to a computing device 110 of a user. The enterprise application platform 120 may comprise web servers and Application Program Interface (API) servers that can be coupled to, and provide web and programmatic interfaces to, application servers. The application servers can be, in turn, coupled to one or more database servers that facilitate access to the database(s) 108. The web servers, API servers, application servers, and database servers can host cross-functional services, which may include relational database modules to provide support services for access to the database(s) 108. Additionally or alternatively, one or more of the components of the data exploration system 100 may be installed and run on a local on-premise network of the computing device 110 or on the computing device 110 itself.

The software application 102 may comprise an enterprise application. An enterprise application is a large software system platform designed to operate in an organization, such as business or government. Enterprise applications may comprise a group of programs with shared business applications and organizational modeling utilities, and they may be developed using enterprise architecture. Enterprise applications may be configured to provide services including, but not limited to, online shopping and payment processing, interactive product catalogs, computerized billing systems, order fulfillment, content management, information technology service management, enterprise resource planning, business intelligence, human resource management, manufacturing, application integration, forms automation, sales force automation, and business process management. Other types of software applications 102 are also within the scope of the present disclosure.

The data exploration system 100 may be configured to provide an improved user interface for efficiently exploring data of the database(s) 108 when the data is displayed on the computing device 110 of a user in a table format having rows and columns or in any other multi-dimensional format. The data may be created by the software application 102 and then stored in the database(s) 108, where the data may then be accessed by the data exploration system 100 for display on the computing device 110.

In some example embodiments, the smart node component 104 may be configured to, given a page layout that is to be displayed on the computing device 110, determine positions within the page layout to enable the user of the computing device 110 to jump between via a scrolling of the page layout that is triggered by a user selection of a corresponding user interface element for the position to which the user wants to navigate. These positions within the page layout may correspond to rows of data records or subsets of data records, as well as columns of fields of the data records.

A page layout may comprise an arrangement of visual elements on an electronic page, such as a web page or any other type of software page or electronic document. Scrolling may comprise the sliding movement of images, video, text, or any other visual elements of the electronic page across a display screen either vertically or horizontally. Scrolling may be enabled when the contents of the electronic page are too big to fit entirely on the screen. Scrolling does not change the layout of the visual elements of the electronic page, but instead moves the user's view across what is apparently a larger image that is not wholly seen. The user's view may be defined by a viewport. When a page layout is displayed on the computing device 110, such as within a browser window, the viewport may be the region of the browser window that contains the visible portion of the page layout. In situations in which the page layout is larger than the viewport, the user may control the portion of the document which is visible by scrolling in the viewport.

In some example embodiments, the smart node component 104 may be configured to obtain a plurality of data records. Each data record in the plurality of data records may comprise a plurality of fields, where each field in the plurality of fields comprises data of a type corresponding to the field. For example, the plurality of data records may comprise a plurality of sales orders, and a data record may comprise fields for data that are relevant to the sales orders, such as a customer name for the sales order, a supplier name for the sales order, and a monetary value for the sales order. Other types of data records and fields are also within the scope of the present disclosure.

The plurality of data records may be obtained from a database table. For example, the plurality of records may be stored in a table format having rows and columns, where each rows comprises a data record and each column comprises a field of the data record. The plurality of data records may be retrieved or otherwise obtained from the database(s) 108.

In some example embodiments, the smart node component 104 may be configured to identify a plurality of subsets of the plurality of data records based on the data records in each subset of the plurality of subsets having an attribute in common with each other data record in the subset. The type of data that is used for the common attribute may be defined based on user input. For example, the user may select a particular type of attribute (e.g., customer name) to use in sorting the plurality of data records, and the smart node component 104 may use that selected type of attribute as the basis for grouping the data records into the plurality of subsets. However, the type of data that is used for the common attribute may also be determined without any influence from such user input.

The attribute that the data records in each subset of the plurality of subsets have in common with each other data record in the subset may comprise the data of a specified field in the plurality of fields. For example, the attribute may comprise a customer name, thereby resulting in the data records corresponding to a particular customer name in the customer name field being grouped into a corresponding subset representing that particular customer, such that all sales order records for Customer A are grouped into a subset for Customer A, all sales order records for Customer B are grouped into a subset for Customer B, all sales order records for Customer C are grouped into a subset for Customer C, and so on and so forth. Other examples of ways in which the plurality of subsets of the plurality of records may be identified based on having a common attribute that comprises data of a specified field in the fields of the data records include, but are not limited to, grouping based on alphabetical order of the specified field (e.g., a first subset for the data records having a customer name beginning with the letter "A", a second subset for the data records having a customer name beginning with the letter "B", and so on and so forth).

Alternatively, the attribute that the data records in each subset of the plurality of subsets has in common with each other data record in the subset may comprise attribute data of a different type than the data of the plurality of fields. For example, the attribute may comprise metadata of the data records or some other type of data that is not part of the fields of the data records. This type of attribute may comprise data that has been computed by an algorithm for the data records, such as a ranking value or some other value that represents an evaluation of the data records, but that is not stored in any of the fields of the data records. This type of attribute may be stored in a separate table and retrieved by the smart node component 104 during the identifying of the plurality of subsets.

In some example embodiments, the user interface component 106 may be configured to arrange the plurality of data records in a page layout based on the identified plurality of subsets. The plurality of data records may be arranged into their corresponding subsets across a first dimension, and the plurality of fields may be arranged across a second dimension that is different from the first dimension. For example, the plurality of data records may be arranged vertically in the layout, such as in rows, and the plurality of fields may be arranged horizontally in the layout, such as in columns, such as in a table.

The user interface component 106 may be configured to cause the page layout to be displayed on the computing device 110. FIGS. 2-8 illustrate different stages of an example graphical user interfaces (GUI) 200 in which smart scrolling features of the data exploration system 100 are used on a page layout being displayed on the computing device 110. In FIG. 2, the page layout displayed within the GUI 200 includes a plurality of data records 210 arranged vertically in rows of a table, and each data record 210 has a plurality of fields 220. The plurality of data records 210 may be arranged in the page layout based on a plurality of subsets 230 that are identified for the plurality of data records 210.

The plurality of subsets 230 may be identified based on a user selection specifying how to sort the data records, such as by the user interacting with a selectable user interface element 215. The plurality of data records 210 may also be sorted based on an attribute that is used as a default in the absence of an explicit user selection.

Each subset 230 may be displayed as a singular representation of the subset 230 without an itemized list of the data records 210 within the subset 230. Each subset 230 may also be displayed along with its corresponding data records 210. The user of the computing device 110 may select a corresponding user interface element (e.g., horizontal/vertical arrowheads, plus/minus signs) for each subset 230 that enables the user to trigger an expansion of the subset 230 to show the specific data records 210 of the subset 230 or to trigger a contraction of the subset 230 to hide the specific data records 210 of the subset 230. In FIG. 2, some of the subsets 230, such as subsets 230-1 through 230-3, have been expanded to show the specific data records 210 included in the subsets 230-1 through 230-3, while other subsets 230, such as subsets 230-4 through 230-6, remain contracted to hide the specific data records 210 included in the subsets 230-4 through 230-6.

In FIG. 2, the plurality of data records 210 represent sales orders and are grouped based on the customer names associated with the sales orders. A first portion of the data records 210 or of the subsets 230 may be displayed within the viewport on the computing device 110, while a second portion of the data records 210 or of the subsets 230 may be excluded from display within the viewport on the computing device 110. For example, in FIG. 2, data records 210-1 through 210-6 and subsets 230-1 through 230-6 are displayed within the viewport, while other data records of the plurality of data records 210 that are included in the page layout are excluded from display within the viewport. Similarly, in FIG. 2, fields 220-1 through 220-6 of the data records 210 are displayed within the viewport, while other fields 220 included in the page layout are excluded from display within the viewport.

The GUI 200 may include one or more user interface elements configured to enable the user to scroll through the page layout. For example, in FIG. 2, the GUI 200 includes a scrollbar 262 that the user may interact with to move the view of the page layout up and down within the viewport, such as by using a pointer 250 to move the scrollbar 262 along a track 260 to move the view of the page layout within the viewport in a corresponding direction. The user can also user the pointer to select arrow buttons 264 or 266 to move the scrollbar 262 up or down, respectively, along the track 260 to move the view of the page layout within the viewport in a corresponding direction.

In some example embodiments, a corresponding user interface element 240 for at least a portion of the subsets 230 may be displayed within the viewport over the page layout. The user interface elements 240 may be displayed to overlay the page layout such that scrolling of the page layout does not result in a corresponding movement of the user interface elements 240. Each user interface element 240 may identify its corresponding subset 230. For example, in FIG. 2, user interface elements 240-1 through 240-6 comprise identifications of their corresponding subsets 230-1 through 230-6 that are displayed within the viewport. The user interface component 106 may also cause corresponding user interface elements 240 to be displayed for subsets 230 that are not displayed within the viewport. For example, in FIG. 2, user interface elements 240-7 through 240-9 are displayed over the page layout within the viewport even though their corresponding subsets 230 are not visible within the viewport.

The user interface component 106 may be configured to receive a user selection of one of the user interface elements 240 from the computing device 110, and, in response to the receiving of the user selection of the user interface element 240, cause the subset 230 corresponding to the selected user interface element 240 to move from a first position to a second position, where the second position is within the viewport on the computing device 110. In some example embodiments, in response to receiving the user selection of the user interface element 240, the user interface component 106 may cause the displayed view of the page layout within the viewport to scroll in a direction across a dimension of the page layout to move the subset 230 corresponding to the selected user interface element 240 to a position that makes it easier for the user to view the data records 210 of the subset 230. For example, the view of the page layout may be scrolled down to move the subset 230 closer to the top of the viewport.

In FIG. 3, the user has used pointer 250 to select the user interface element 240-5 that corresponds to subset 230-5, causing the user interface component 106 to scroll the view of the page layout down so that the subset 230-5 is moved to the top of the viewport. As a result of the subset 230-5 being moved to a position that allows for more detail of the subset 230-5 to be displayed within the viewport, the user interface component 106 may also cause the corresponding data records 210-7 through 210-9 of the subset 230-5 to be displayed, such as by automatically expanding the view of the subset 230-5. The user may also select the user interface element 240 of a subset 230 that is not currently visible within the viewport, thereby causing the subset 230 to be brought into view of the user within the viewport. For example, in FIG. 2, the user may select the user interface element 240-9 that corresponds to subset 230-9 that is not visible within the viewport in FIG. 2, but that may be moved into a visible position within the viewport in response to the selection of the user interface element 240-9.

In some example embodiments, such as shown in FIG. 4, the user interface component 106 may cause a corresponding user interface element 420 for one or more of the plurality of fields 220 to be displayed over the page layout. The user interface element 420 may comprise an identification of its corresponding field 220. In addition to the user interface elements 420 of fields 220 that are currently visible within the viewport being displayed, the user interface elements 420 of fields that are not visible within the viewport may also be displayed. For example, in FIG. 4, the GUI 200 includes user interface elements 420-1 through 420-7 that correspond to the fields 220-1 through 220-7 that are displayed within the viewport, as well as user interface element 420-8 that corresponds to the field 220-8 that is not yet visible within the viewport in FIG. 4 (but is visible within the viewport in FIGS. 5-8). The user interface component 106 may also cause a user interface element 425 to be displayed to enable the user to trigger the display of additional user interface elements 420 that are not currently visible due to limited screen size.

In some example embodiments, a first portion of the fields 220 may be displayed in a non-scrollable section of the viewport on the computing device 110, while a second portion of the fields 220 may be displayed in a scrollable section of the viewport on the computing device 110. The first portion of the fields 220 in the non-scrollable section may be unable to be scrolled across a particular dimension, wherein the second portion of the fields 220 in the scrollable section may be able to be scrolled across the particular dimension. In FIG. 4, the GUI 200 includes a scrollbar 462 that the user may interact with to move the view of the page layout left and right within the viewport, such as by using the pointer 250 to move the scrollbar 462 along a track 460 to move the view of the page layout within the viewport in a corresponding direction. The user can also user the pointer to select arrow buttons 464 or 466 to move the scrollbar 462 left or right, respectively, along the track 460 to move the view of the page layout within the viewport in a corresponding direction.

In FIG. 4, the GUI 200 includes a first indicator 410, such as a dividing line, that is displayed to separate and define the non-scrollable section of fields 220 and the scrollable section of fields 220, as well as a second indicator 430, such as dividing line, that is displayed to identify which user interface elements 420 correspond to the fields 220 in the non-scrollable section and which user interface elements 420 correspond to the fields 220 in the scrollable section. In the example shown in FIG. 4, the fields 220-1 and 220-2 are in the non-scrollable section to the left of the first indicator 410, while the other fields 220-3 through 220-7, as well as any other fields 220 that are not included in the non-scrollable section, are in the scrollable section to the right of the first indicator 410. Additionally, in the example shown in FIG. 4, the user interface elements 420-1 and 420-2 corresponding to the fields 220-1 and 220-2 in the non-scrollable section are similarly displayed on the left side of the second indicator 430 to indicate that their corresponding fields 220 are in the non-scrollable section, while the other user interface elements 420-3—through 420-8 corresponding to the fields 220-3 through 220-8 in the scrollable section are displayed on the right side of the second indicator 430 to indicate that their corresponding fields 220 are in the scrollable section.

As seen in the example shown in FIGS. 4 and 5, when the user uses the pointer 250 in FIG. 4 to select the arrow button 466 to scroll right, this user input results in only the view of the page layout in the scrollable section to the right of the first indicator 410 being scrolled to the right, while the view of the page layout in the non-scrollable section to the right of the first indicator 410 remains in a fixed position, as shown in FIG. 5. In FIG. 5, the fields 220 in the scrollable section to the right of the first indicator 410 have been scrolled to the right, while the fields 220 in the non-scrollable section to the left of the first indicator 410 have not been scrolled at all, but rather have remained stationary.

In some example embodiments, the user interface component 106 may be configured to receive a user selection of the corresponding user interface element 420 of one of the fields 220 from the computing device 110, and, in response to the receiving of the user selection of the corresponding user interface element 420 of the field 220, cause the field 220 to move from a first position to a second position. In the example shown in FIG. 6, the user has just selected the user interface element 420-4 using the pointer 250 while viewing the GUI 200 in FIG. 5. As a result of the user selection of the user interface element 420-4, the corresponding field 220-4 is moved from a first position that is not visible within the viewport in FIG. 5 to a second position that is visible within the viewport in FIG. 6, such as by the user interface component 106 scrolling the view of the fields 220 in the scrollable section to the left until the field 220-4 is visible within the scrollable section in FIG. 6. In addition to moving the field 220 corresponding to the selected user interface element 420 from a position that is not visible within the viewport to a position that is visible within the viewport, the user interface component 106 may also move the field 220 from a first position that is visible within the viewport to a second position that is also visible within the viewport, but where the second position of the field 220 is better positioned for viewing, such as to a position that is adjacent to the first indicator 410 on the border of the scrollable section.

The user interface component 106 may also receive a user input indicating a movement of one of the user interface elements 420 of one of the fields 220 in the scrollable section of the viewport into alignment with the non-scrollable section of the viewport, such as to the non-scrollable side of the second indicator 430. In response to the receiving of the user input, the user interface component 106 may move the corresponding field 220 from the scrollable section of the viewport into the non-scrollable section of the viewport. In the example shown in FIG. 7, the user has just used the pointer 250 to move the user interface element 420-4 corresponding to field 220-4 from the scrollable section to the non-scrollable section while viewing the GUI 200 in FIG. 6. As a result of this user input moving the user interface element 420-4 to the non-scrollable section, the corresponding field 220-4 is moved from the scrollable section to the right of the first indicator 410 to the non-scrollable section to the left of the first indicator 410, as shown in FIG. 7. Furthermore, since the field 220-4 has been moved from the scrollable section to the non-scrollable section, the field 220-4 remains in a fixed position along with the other fields 220-1 and 220-2 in the non-scrollable section when the user scrolls through the fields 220 in the page layout. In the example shown in FIG. 8, the user has just used the pointer 250 in FIG. 7 to select the arrow button 466 to scroll right, thereby causing the view of the fields 220 in the scrollable section that no longer includes the field 220-4 to scroll to the right, but leaves the field 220-4 in a fixed position in the non-scrollable section, as shown in FIG. 8.

The user interface component 106 may also receive a user input indicating a movement of the corresponding user interface element 420 of one of the fields 220 in the non-scrollable section of the viewport into alignment with the scrollable section of the viewport. In response to the receiving of the user input, the user interface component 106 may move the corresponding field 220 from the non-scrollable section of the viewport into the scrollable section of the viewport. As a result of the movement of the corresponding field 220 from the non-scrollable section of the viewport into the scrollable section of the viewport, the moved field 220 may be able to be scrolled along a particular dimension (e.g., scrolled horizontally).

Figure 9:
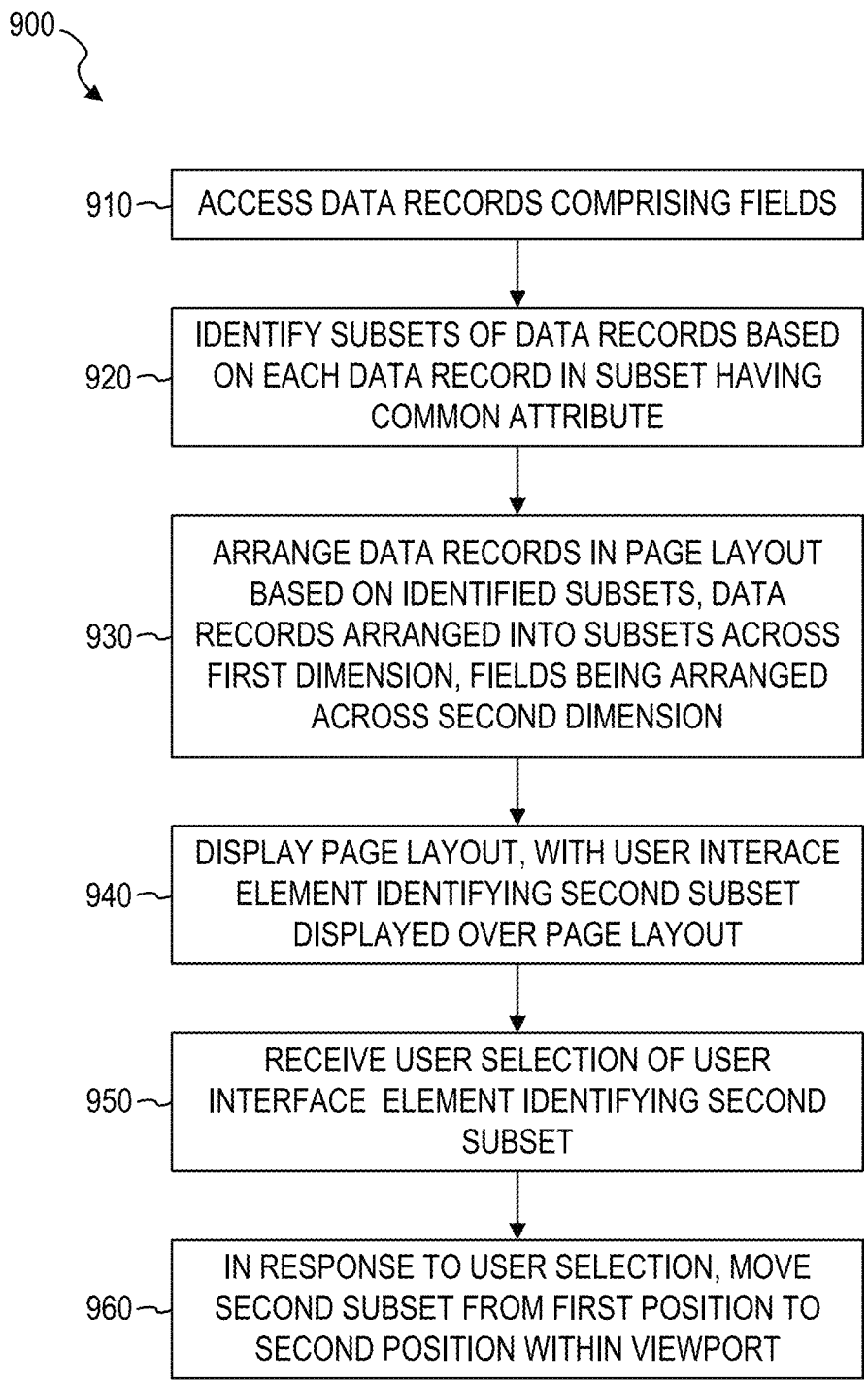
FIG. 9 is a flowchart illustrating an example method of implementing smart scrolling.

FIG. 9 is a flowchart illustrating an example method 900 of implementing smart scrolling. The method 900 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 900 are performed by the data exploration system 100 of FIG. 1 or any combination of one or more of its components (e.g., the smart node component 104, the user interface component 106).

At operation 910, the data exploration system 100 may access a plurality of data records 210. Each data record 210 in the plurality of data records 210 may comprise a plurality of fields 220, and each field 220 in the plurality of fields 220 may comprise data of a type corresponding to the field 220. In some example embodiments, the plurality of data records 210 are obtained from a database table. However, the plurality of data records 210 may be accessed in other ways and from other sources as well.

Next, the data exploration system 100 may, at operation 920, identify a plurality of subsets 230 of the plurality of data records 210 based on the data records 210 in each subset 230 of the plurality of subsets 230 having an attribute in common with each other data record 210 in the subset 230. The plurality of subsets 230 may comprise a first subset 230 of the plurality of data records 210 and a second subset 230 of the plurality of data records 210. In some example embodiments, the attribute that the data records 210 in each subset 230 of the plurality of subsets 230 have in common with each other data record 210 in the subset 230 may comprise the data of a specified field 220 in the plurality of fields 220. In other example embodiments, the attribute that the data records 210 in each subset 230 of the plurality of subsets 230 have in common with each other data record 210 in the subset 230 may comprise attribute data of a different type than the data of the plurality of fields 220.

The data exploration system 100 may then arrange the plurality of data records 210 in a page layout based on the identified plurality of subsets 230, at operation 930. The plurality of data records 210 may be arranged into their corresponding subsets 230 across a first dimension, while the plurality of fields 220 may be arranged across a second dimension. For example, the plurality of data records 210 may be arranged vertically as rows in the layout, and the plurality of fields 220 may be arranged as columns horizontally in the layout. Other ways of arranging the plurality of data records 210 and the plurality of fields 220 in the page layout are also within the scope of the present disclosure.

At operation 940, the data exploration system 100 may cause the page layout to be displayed on a computing device 110. The causing of the page layout to be displayed may further comprise causing the first subset 230 to be displayed within the viewport on the computing device 110 and causing the second subset 230 to be excluded from display within the viewport on the computing device 110. The causing of the page layout to be displayed may also comprise causing a user interface element 240 identifying the second subset 230 to be displayed over the page layout. In some example embodiments, the causing of the user interface element 240 identifying the second subset 230 to be displayed over the page layout may comprise causing a corresponding user interface element 420 for one or more of the plurality of fields 220 to be displayed over the page layout. Each user interface element 420 may identify its corresponding field 220.

Next, the data exploration system 100 may, at operation 950, receive a user selection of the user interface element 240 identifying the second subset 230 from the computing device 110. For example, the user may select the user interface element 240 identifying the second subset 230 using a pointer 250. However, the user selection may be received in other ways as well.

The data exploration system 100 may then, in response to the receiving of the user selection, cause the second subset 230 to move from a first position to a second position, at operation 960. For example, the data exploration system 100 may cause a scrolling of a view of the subsets 230 within the viewport. The second position may be within a viewport on the computing device 110. The second subset 230 may be moved from a first position that is not visible within the viewport to a second position that is visible within the viewport. Alternatively, the second subset 230 may be moved from a first position that is visible within the viewport to a second position that is also visible within the viewport.

It is contemplated that any of the other features described within the present disclosure can be incorporated into the method 900.

Figure 10:
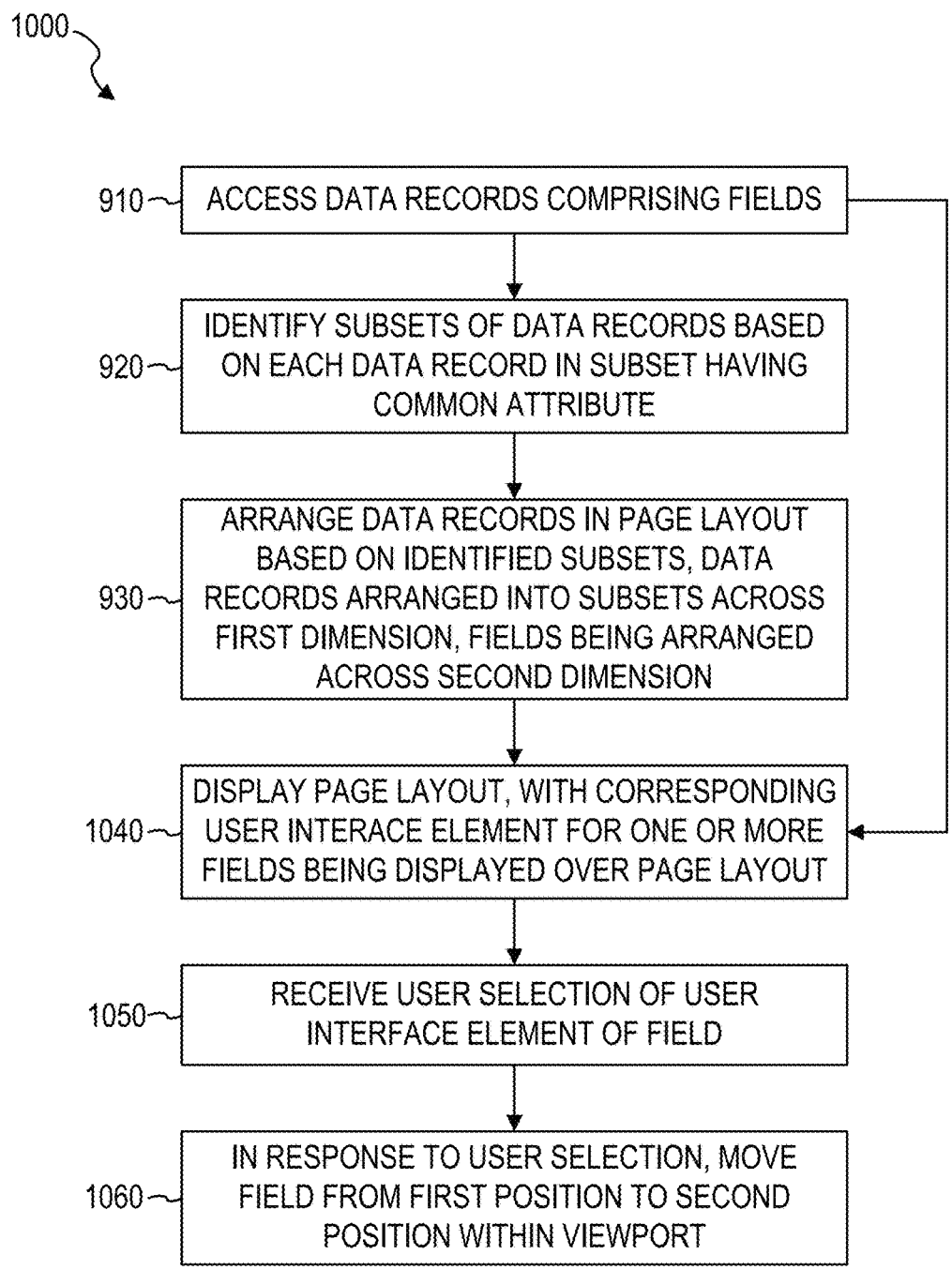
FIG. 10 is a flowchart illustrating another example method of implementing smart scrolling.

FIG. 10 is a flowchart illustrating another example method 1000 of implementing smart scrolling. The method 1000 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 1000 are performed by the data exploration system 100 of FIG. 1 or any combination of one or more of its components (e.g., the smart node component 104, the user interface component 106). The method 1000 may comprise operations 1040, 1050, and 1060 being performed subsequent to operation 910 of the method 900 being performed or subsequent to operation 930 of the method 90 being performed.

At operation 1040, the data exploration system 100 may cause a corresponding user interface element 420 for one or more of the plurality of fields 220 to be displayed over the page layout. The corresponding user interface element 420 may identify its corresponding field 220. Next, the data exploration system 100 may, at operation 1050, receive a user selection of the corresponding user interface element 420 of one of the fields 220 of the plurality of fields 220 from the computing device 110. The data exploration system 100 may then, in response to the receiving of the user selection of the corresponding user interface element 420 of the one of the fields 220, cause the one of the fields 220 to move from a first position to a second position, at operation 1060. The second position may be within a viewport on the computing device 110.

It is contemplated that any of the other features described within the present disclosure can be incorporated into the method 1000.

Figure 11:
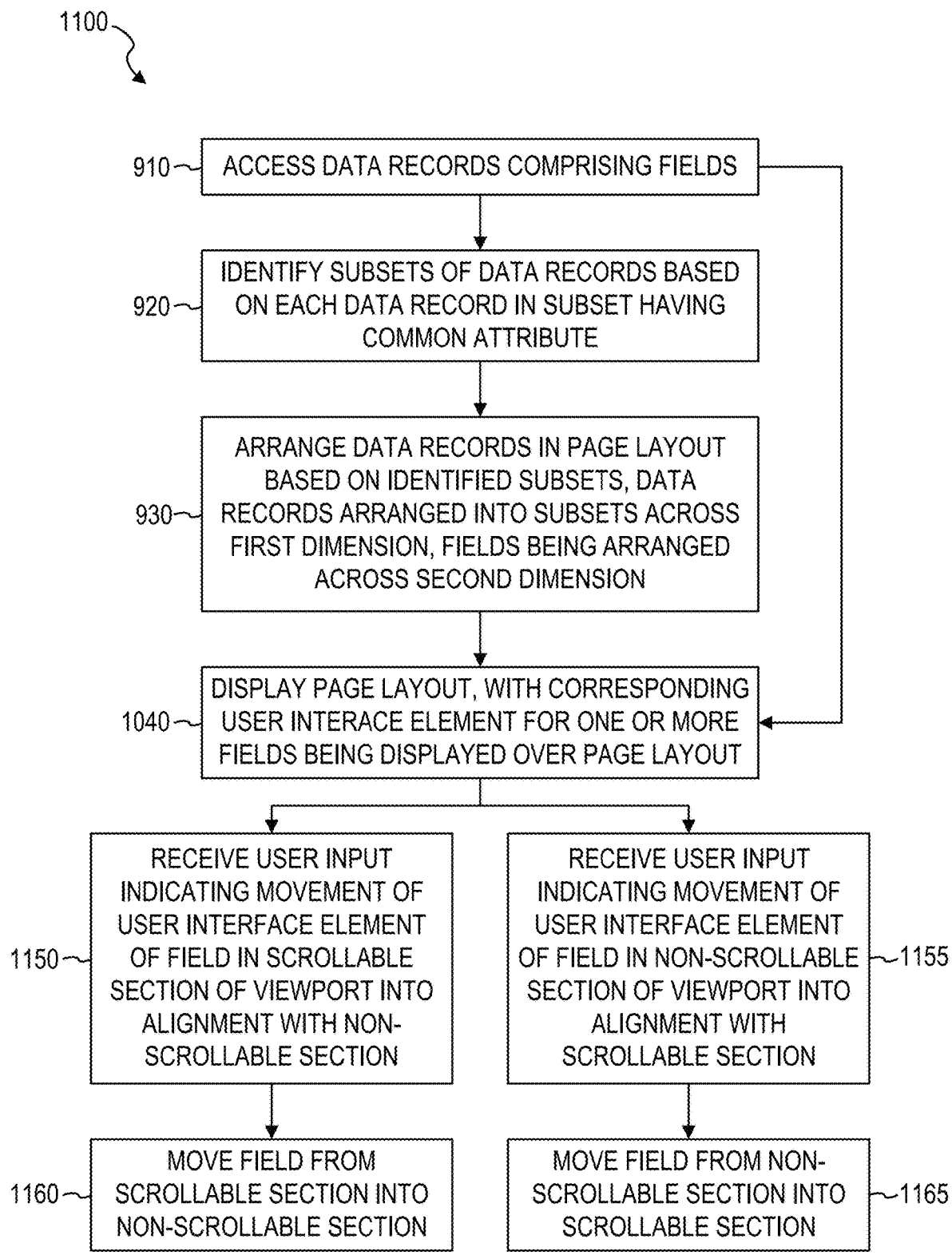
FIG. 11 is a flowchart illustrating yet another example method of implementing smart scrolling.

FIG. 11 is a flowchart illustrating yet another example method 1100 of implementing smart scrolling. The method 1100 can be performed by processing logic that can comprise hardware (e.g., circuitry, dedicated logic, programmable logic, microcode, etc.), software (e.g., instructions run on a processing device), or a combination thereof. In one example embodiment, one or more of the operations of the method 1100 are performed by the data exploration system 100 of FIG. 1 or any combination of one or more of its components (e.g., the smart node component 104, the user interface component 106). The method 1100 may comprise operations 1150, 1155, 1160, and 1165 being performed subsequent to operation 910 of the method 900 being performed or subsequent to operation 1040 of the method 1000 being performed.

At operation 1040, a first portion of the fields 220 of the plurality of fields 220 may be displayed in a non-scrollable section of the viewport on the computing device 110 and a second portion of the fields 220 of the plurality of fields 220 may be displayed in a scrollable section of the viewport on the computing device 110. The first portion of the fields 220 in the non-scrollable section may be unable to be scrolled across the second dimension (e.g., horizontally), while the second portion of the fields 220 in the scrollable section may be able to be scrolled across the second dimension. In some example embodiments, the causing of the page layout to be displayed on the computing device 110 may further comprise causing a corresponding user interface element 420 for one or more of the plurality of fields 220 to be displayed over the page layout. The user interface element 420 may identify its corresponding field 220.

At operation 1150, the data exploration system 100 may receive a user input indicating a movement of the user interface element 420 of one of the fields 220 in the scrollable section of the viewport into alignment with the non-scrollable section of the viewport. Then, the data exploration system 100 may, in response to the receiving of the user input, move the one of the fields 220 from the scrollable section of the viewport into the non-scrollable section of the viewport, at operation 1160. The moved one of the fields 220 may then be unable to be scrolled across the second dimension based on its movement into the non-scrollable section of the viewport.

At operation 1155, the data exploration system 100 may receive a user input indicating a movement of the user interface element 420 of one of the fields 220 in the non-scrollable section of the viewport into alignment with the scrollable section of the viewport. Then, the data exploration system 100 may, in response to the receiving of the user input, move the one of the fields 220 from the non-scrollable section of the viewport into the scrollable section of the viewport, at operation 1165. The moved one of the fields 220 may then be able to be scrolled across the second dimension based on its movement into the scrollable section of the viewport.

It is contemplated that any of the other features described within the present disclosure can be incorporated into the method 1100.

In view of the disclosure above, various examples are set forth below. It should be noted that one or more features of an example, taken in isolation or combination, should be considered within the disclosure of this application.

Example 1 includes a computer-implemented method performed by a computer system having a memory and at least one hardware processor, the computer-implemented method comprising: accessing a plurality of data records, each data record in the plurality of data records comprising a plurality of fields, each field in the plurality of fields comprising data of a type corresponding to the field; identifying a plurality of subsets of the plurality of data records based on the data records in each subset of the plurality of subsets having an attribute in common with each other data record in the subset, the plurality of subsets comprising a first subset of the plurality of data records and a second subset of the plurality of data records; arranging the plurality of data records in a page layout based on the identified plurality of subsets, the plurality of data records being arranged into their corresponding subsets across a first dimension, the plurality of fields being arranged across a second dimension; causing the page layout to be displayed on a computing device, the causing the page layout to be displayed comprising causing a user interface element identifying the second subset to be displayed over the page layout; receiving a user selection of the user interface element identifying the second subset from the computing device; and, in response to the receiving of the user selection of the user interface element identifying the second subset, causing the second subset to move from a first position to a second position, the second position being within a viewport on the computing device.

Example 2 includes the computer-implemented method of example 1, wherein the causing of the page layout to be displayed further comprises causing the first subset to be displayed within the viewport on the computing device and causing the second subset to be excluded from display within the viewport on the computing device.

Example 3 includes the computer-implemented method of example 1 or example 2, wherein the attribute that the data records in each subset of the plurality of subsets have in common with each other data record in the subset comprises the data of a specified field in the plurality of fields.

Example 4 includes the computer-implemented method of any one of examples 1 to 3, wherein the attribute that the data records in each subset of the plurality of subsets have in common with each other data record in the subset comprises attribute data of a different type than the data of the plurality of fields.

Example 5 includes the computer-implemented method of any one of examples 1 to 4, wherein the plurality of data records are arranged vertically in the page layout, and the plurality of fields are arranged horizontally in the page layout.

Example 6 includes the computer-implemented method of any one of examples 1 to 5, wherein the causing of the user interface element identifying the second subset to be displayed over the page layout comprises causing a corresponding user interface element for each subset in the plurality of subsets displayed within the viewport to be displayed over the page layout, each corresponding user interface element identifying its corresponding subset.

Example 7 includes the computer-implemented method of any one of examples 1 to 6, wherein the causing of the page layout to be displayed on the computing device further comprises causing a corresponding user interface element for one or more of the plurality of fields to be displayed over the page layout, the user interface element identifying its corresponding field, and the computer-implemented method further comprises: receiving a user selection of the corresponding user interface element of one of the fields of the plurality of fields from the computing device; and, in response to the receiving of the user selection of the corresponding user interface element of the one of the fields, causing the one of the fields to move from a first position to a second position, the second position being within a viewport on the computing device.

Example 8 includes the computer-implemented method of any one of examples 1 to 7, wherein: a first portion of the fields of the plurality of fields is displayed in a non-scrollable section of the viewport on the computing device, the first portion of the fields in the non-scrollable section being unable to be scrolled across the second dimension; a second portion of the fields of the plurality of fields is displayed in a scrollable section of the viewport on the computing device, the second portion of the fields in the scrollable section being able to be scrolled across the second dimension; and the causing of the page layout to be displayed on the computing device further comprises causing a corresponding user interface element for one or more of the plurality of fields to be displayed over the page layout, the user interface element identifying the corresponding field.

Example 9 includes the computer-implemented method of any one of examples 1 to 8, further comprising: receiving a user input indicating a movement of the user interface element of one of the fields in the scrollable section of the viewport into alignment with the non-scrollable section of the viewport; and, in response to the receiving of the user input, moving the one of the fields from the scrollable section of the viewport into the non-scrollable section of the viewport, the moved one of the fields being unable to be scrolled across the second dimension based on its movement into the non-scrollable section of the viewport.

Example 10 includes the computer-implemented method of any one of examples 1 to 9, further comprising: receiving a user input indicating a movement of the user interface element of one of the fields in the non-scrollable section of the viewport into alignment with the scrollable section of the viewport; and, in response to the receiving of the user input, moving the one of the fields from the non-scrollable section of the viewport into the scrollable section of the viewport, the moved one of the fields being able to be scrolled across the second dimension based on its movement into the scrollable section of the viewport.

Example 11 includes the computer-implemented method of any one of examples 1 to 10, wherein the plurality of data records are obtained from a database table.

Example 12 includes a system comprising: at least one processor; and a non-transitory computer-readable medium storing executable instructions that, when executed, cause the at least one processor to perform the method of any one of examples 1 to 11.

Example 13 includes a non-transitory machine-readable storage medium, tangibly embodying a set of instructions that, when executed by at least one processor, causes the at least one processor to perform the method of any one of examples 1 to 11.

Example 14 includes a machine-readable medium carrying a set of instructions that, when executed by at least one processor, causes the at least one processor to carry out the method of any one of examples 1 to 11.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client, or server computer system) or one or more hardware modules of a computer system (e.g., a processor or a group of processors) may be configured by software (e.g., an application or application portion) as a hardware module that operates to perform certain operations as described herein.

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 114 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

Figure 12:
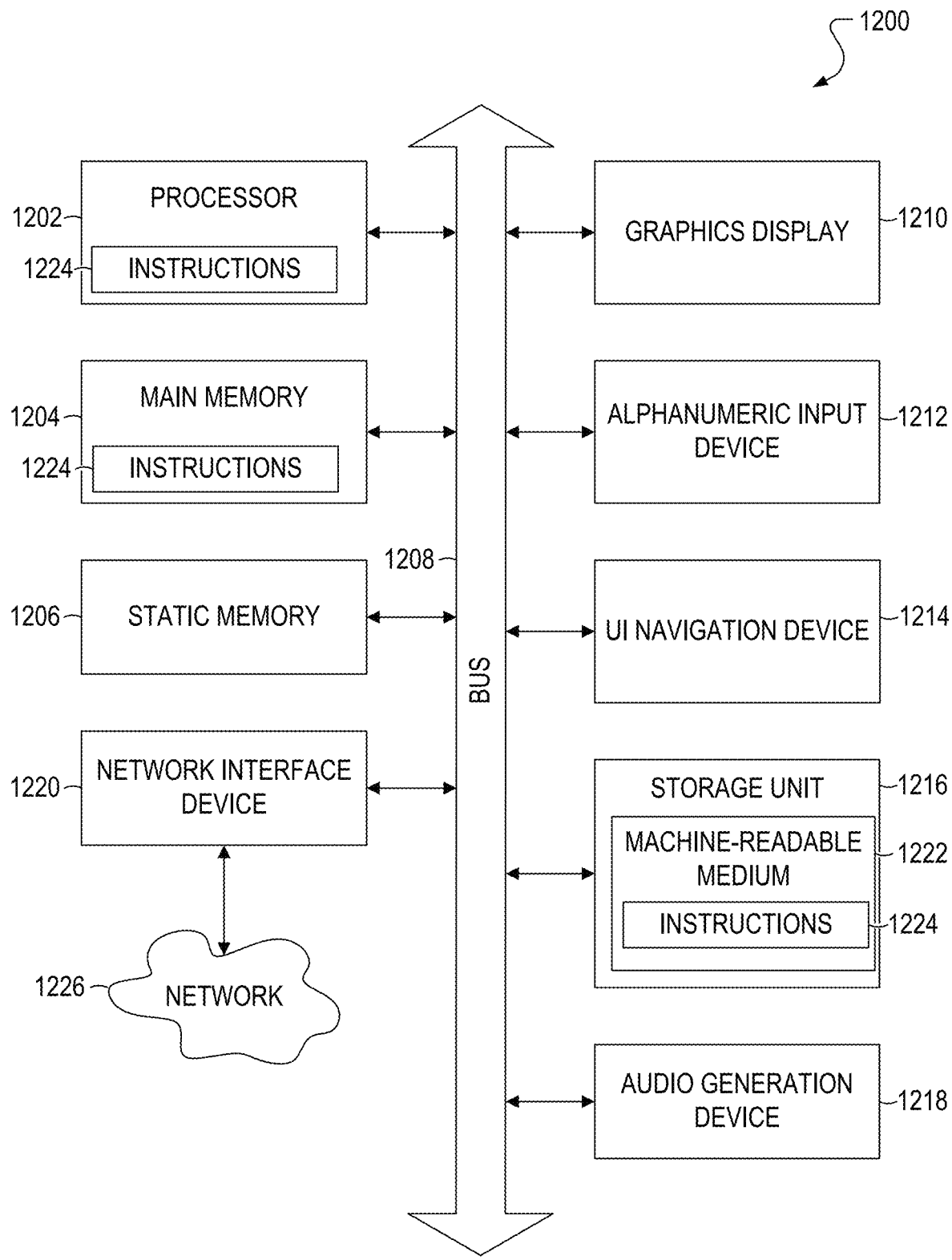
FIG. 12 is a block diagram of an example computer system on which methodologies described herein can be executed.

FIG. 12 is a block diagram of a machine in the example form of a computer system 1200 within which instructions 1224 for causing the machine to perform any one or more of the methodologies discussed herein may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1200 includes a processor 1202 (e.g., a central processing unit (CPU), a graphics processing unit (GPU) or both), a main memory 1204, and a static memory 1206, which communicate with each other via a bus 1208. The computer system 1200 may further include a graphics or video display unit 1210 (e.g., a liquid crystal display (LCD) or a cathode ray tube (CRT)). The computer system 1200 also includes an alphanumeric input device 1212 (e.g., a keyboard), a user interface (UI) navigation (or cursor control) device 1214 (e.g., a mouse), a storage unit (e.g., a disk drive unit) 1216, an audio or signal generation device 1218 (e.g., a speaker), and a network interface device 1220.

The storage unit 1216 includes a machine-readable medium 1222 on which is stored one or more sets of data structures and instructions 1224 (e.g., software) embodying or utilized by any one or more of the methodologies or functions described herein. The instructions 1224 may also reside, completely or at least partially, within the main memory 1204 and/or within the processor 1202 during execution thereof by the computer system 1200, the main memory 1204 and the processor 1202 also constituting machine-readable media. The instructions 1224 may also reside, completely or at least partially, within the static memory 1206.

While the machine-readable medium 1222 is shown in an example embodiment to be a single medium, the term "machine-readable medium" may include a single medium or multiple media (e.g., a centralized or distributed database, and/or associated caches and servers) that store the one or more instructions 1224 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and compact disc-read-only memory (CD-ROM) and digital versatile disc (or digital video disc) read-only memory (DVD-ROM) disks.

The instructions 1224 may further be transmitted or received over a communications network 1226 using a transmission medium. The instructions 1224 may be transmitted using the network interface device 1220 and any one of a number of well-known transfer protocols (e.g., HTTP). Examples of communication networks include a LAN, a WAN, the Internet, mobile telephone networks, POTS networks, and wireless data networks (e.g., WiFi and WiMAX networks). The term "transmission medium" shall be taken to include any intangible medium capable of storing, encoding, or carrying instructions for execution by the machine, and includes digital or analog communications signals or other intangible media to facilitate communication of such software.

This detailed description is merely intended to teach a person of skill in the art further details for practicing certain aspects of the present teachings and is not intended to limit the scope of the claims. Therefore, combinations of features disclosed above in the detailed description may not be necessary to practice the teachings in the broadest sense, and are instead taught merely to describe particularly representative examples of the present teachings.

Unless specifically stated otherwise, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof show, by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A computer-implemented method comprising:
   accessing, from a first database table, a plurality of data records, each data record in the plurality of data records comprising a plurality of fields, each field in the plurality of fields comprising data of a type corresponding to the field;
   identifying a plurality of subsets of the plurality of data records based on the data records in each subset of the plurality of subsets having an attribute in common with each other data record in the subset, the plurality of subsets comprising a first subset of the plurality of data records and a second subset of the plurality of data records, wherein the attribute that the data records in each subset of the plurality of subsets have in common with each other data record in the subset is stored in a second database table;
   arranging the plurality of data records in a page layout based on the identified plurality of subsets, the plurality of data records being arranged into their corresponding subsets across a first dimension, the plurality of fields being arranged across a second dimension;
   causing the page layout to be displayed on a computing device, the causing the page layout to be displayed comprising:
      causing a user interface element identifying the second subset to be displayed over the page layout, wherein a first portion of the fields of the plurality of fields is displayed in a non-scrollable section of a viewport on the computing device and a second portion of the fields of the plurality of fields is displayed in a scrollable section of the viewport on the computing device, the first portion of the fields in the non-scrollable section being unable to be scrolled across the second dimension, the second portion of the fields in the scrollable section being able to be scrolled across the second dimension; and
      causing a corresponding user interface element for one or more of the plurality of fields to be displayed over the page layout, the user interface element identifying its corresponding field;
   receiving a user selection of the user interface element identifying the second subset from the computing device;
   in response to the receiving of the user selection of the user interface element identifying the second subset, causing the second subset to move from a first position to a second position, the second position being within a viewport on the computing device;
   receiving a user input indicating a movement of the corresponding user interface element of one of the fields in the scrollable section of the viewport into alignment with the non-scrollable section of the viewport; and
   in response to the receiving of the user input, moving the one of the fields from the scrollable section of the viewport into the non-scrollable section of the viewport, the moved one of the fields being unable to be scrolled across the second dimension based on its movement into the non-scrollable section of the viewport.

2. The computer-implemented method of claim 1, wherein the causing of the page layout to be displayed further comprises causing the first subset to be displayed within the viewport on the computing device and causing the second subset to be excluded from display within the viewport on the computing device.

3. The computer-implemented method of claim 1, wherein the plurality of data records are arranged vertically in the page layout, and the plurality of fields are arranged horizontally in the page layout.

4. The computer-implemented method of claim 1, wherein the causing of the user interface element identifying the second subset to be displayed over the page layout comprises causing a corresponding user interface element for each subset in the plurality of subsets displayed within the viewport to be displayed over the page layout, each corresponding user interface element identifying its corresponding subset.

5. The computer-implemented method of claim 1, further comprising:
   receiving a user input indicating a movement of the corresponding user interface element of one of the fields in the non-scrollable section of the viewport into alignment with the scrollable section of the viewport; and
   in response to the receiving of the user input, moving the one of the fields from the non-scrollable section of the viewport into the scrollable section of the viewport, the moved one of the fields being able to be scrolled across the second dimension based on its movement into the scrollable section of the viewport.

6. A system comprising:
   at least one hardware processor; and
   a non-transitory computer-readable medium storing executable instructions that, when executed, cause the at least one hardware processor to perform computer operations comprising:
      accessing, from a first database table, a plurality of data records, each data record in the plurality of data records comprising a plurality of fields, each field in the plurality of fields comprising data of a type corresponding to the field;

identifying a plurality of subsets of the plurality of data records based on the data records in each subset of the plurality of subsets having an attribute in common with each other data record in the subset, the plurality of subsets comprising a first subset of the plurality of data records and a second subset of the plurality of data records, wherein the attribute that the data records in each subset of the plurality of subsets have in common with each other data record in the subset is stored in a second database table;

arranging the plurality of data records in a page layout based on the identified plurality of subsets, the plurality of data records being arranged into their corresponding subsets across a first dimension, the plurality of fields being arranged across a second dimension;

causing the page layout to be displayed on a computing device, the causing the page layout to be displayed comprising:

causing a user interface element identifying the second subset to be displayed over the page layout, wherein a first portion of the fields of the plurality of fields is displayed in a non-scrollable section of a viewport on the computing device and a second portion of the fields of the plurality of fields is displayed in a scrollable section of the viewport on the computing device, the first portion of the fields in the non-scrollable section being unable to be scrolled across the second dimension, the second portion of the fields in the scrollable section being able to be scrolled across the second dimension; and causing a corresponding user interface element for one or more of the plurality of fields to be displayed over the page layout, the user interface element identifying its corresponding field;

receiving a user selection of the user interface element identifying the second subset from the computing device;

in response to the receiving of the user selection of the user interface element identifying the second subset, causing the second subset to move from a first position to a second position, the second position being within the viewport on the computing device;

receiving a user input indicating a movement of the corresponding user interface element of one of the fields in the scrollable section of the viewport into alignment with the non-scrollable section of the viewport; and in response to the receiving of the user input, moving the one of the fields from the scrollable section of the viewport into the non-scrollable section of the viewport, the moved one of the fields being unable to be scrolled across the second dimension based on its movement into the non-scrollable section of the viewport.

7. The system of claim 6, wherein the causing of the page layout to be displayed further comprises causing the first subset to be displayed within the viewport on the computing device and causing the second subset to be excluded from display within the viewport on the computing device.

8. The system of claim 6, wherein the plurality of data records are arranged vertically in the page layout, and the plurality of fields are arranged horizontally in the page layout.

9. The system of claim 6, wherein the causing of the user interface element identifying the second subset to be displayed over the page layout comprises causing a corresponding user interface element for each subset in the plurality of subsets displayed within the viewport to be displayed over the page layout, each corresponding user interface element identifying its corresponding subset.

10. A non-transitory machine-readable storage medium tangibly embodying a set of instructions that, when executed by at least one hardware processor, causes the at least one hardware processor to perform computer operations comprising:

accessing, from a first database table, a plurality of data records, each data record in the plurality of data records comprising a plurality of fields, each field in the plurality of fields comprising data of a type corresponding to the field;

identifying a plurality of subsets of the plurality of data records based on the data records in each subset of the plurality of subsets having an attribute in common with each other data record in the subset, the plurality of subsets comprising a first subset of the plurality of data records and a second subset of the plurality of data records, wherein the attribute that the data records in each subset of the plurality of subsets have in common with each other data record in the subset is stored in a second database table;

arranging the plurality of data records in a page layout based on the identified plurality of subsets, the plurality of data records being arranged into their corresponding subsets across a first dimension, the plurality of fields being arranged across a second dimension;

causing the page layout to be displayed on a computing device, the causing the page layout to be displayed comprising:

causing a user interface element identifying the second subset to be displayed over the page layout, wherein a first portion of the fields of the plurality of fields is displayed in a non-scrollable section of a viewport on the computing device and a second portion of the fields of the plurality of fields is displayed in a scrollable section of the viewport on the computing device, the first portion of the fields in the non-scrollable section being unable to be scrolled across the second dimension, the second portion of the fields in the scrollable section being able to be scrolled across the second dimension; and causing a corresponding user interface element for one or more of the plurality of fields to be displayed over the page layout, the user interface element identifying its corresponding field;

receiving a user selection of the user interface element identifying the second subset from the computing device;

in response to the receiving of the user selection of the user interface element identifying the second subset, causing the second subset to move from a first position to a second position, the second position being within the viewport on the computing device;

receiving a user input indicating a movement of the corresponding user interface element of one of the fields in the non-scrollable section of the viewport into alignment with the scrollable section of the viewport; and in response to the receiving of the user input, moving the one of the fields from the non-scrollable section of the viewport into the scrollable section of the viewport, the moved one of the fields being able to be scrolled across the second dimension based on its movement into the scrollable section of the viewport.

11. The non-transitory machine-readable storage medium of claim 10, wherein the causing of the page layout to be displayed further comprises causing the first subset to be displayed within the viewport on the computing device and causing the second subset to be excluded from display within the viewport on the computing device.

12. The non-transitory machine-readable storage medium of claim 10, wherein the plurality of data records are arranged vertically in the page layout, and the plurality of fields are arranged horizontally in the page layout.

13. The non-transitory machine-readable storage medium of claim 10, wherein the causing of the user interface element identifying the second subset to be displayed over the page layout comprises causing a corresponding user interface element for each subset in the plurality of subsets displayed within the viewport to be displayed over the page layout, each corresponding user interface element identifying its corresponding subset.

14. The non-transitory machine-readable storage medium of claim 10, wherein the computer operations further comprise:
receiving a second user input indicating a movement of the corresponding user interface element of one of the fields in the scrollable section of the viewport into alignment with the non-scrollable section of the viewport; and
in response to the receiving of the second user input, moving the one of the fields from the scrollable section of the viewport into the non-scrollable section of the viewport, the moved one of the fields being unable to be scrolled across the second dimension based on its movement into the non-scrollable section of the viewport.

* * * * *